Sept. 3, 1929.  J. H. CROSS ET AL  1,726,695
CRESCENT RADIATOR
Filed Aug. 31, 1928   2 Sheets-Sheet 1

INVENTORS
JOHN HENRY CROSS
ERNEST W. FRANKLIN
EARL L. SCHNEIDER
By Paul, Paul Moore
ATTORNEYS Sept. 3, 1929.  J. H. CROSS ET AL  1,726,695
CRESCENT RADIATOR
Filed Aug. 31, 1928   2 Sheets-Sheet 2

INVENTORS
JOHN HENRY CROSS
ERNEST W. FRANKLIN
EARL L. SCHNEIDER

ATTORNEYS

Patented Sept. 3, 1929.

1,726,695

UNITED STATES PATENT OFFICE.

JOHN HENRY CROSS, ERNEST W. FRANKLIN, AND EARL L. SCHNEIDER, OF MINNEAPOLIS, MINNESOTA, ASSIGNORS TO THE WATERMAN-WATERBURY COMPANY, OF MINNEAPOLIS, MINNESOTA, A CORPORATION OF MINNESOTA.

CRESCENT RADIATOR.

Application filed August 31, 1928. Serial No. 303,242.

This invention relates to new and useful improvements in crescent radiators such as the one shown in Patent No. 1,632,000, granted to John Henry Cross, June 14, 1927.

An object of the present invention is to provide a gas tight joint at the point where the damper control rod projects through the wall of the radiator.

A further object is to provide a furnace radiator having a partition therein in which a damper is mounted, and a control rod being connected with the damper and projecting from the upper wall of the radiator, and said wall having a sleeve formed thereon and projecting inwardly and fitting into a socket provided in the adjacent edge of the partition, said sleeve and socket being traversed by the damper control rod, and the latter having a packing nut mounted thereon and received in threaded engagement with the sleeve, and between the lower end of which and the bottom of the socket, a suitable packing is interposed, which may be compressed by rotation of the packing nut to prevent the leakage of gaseous fumes from the interior of the radiator.

A further object resides in the particular construction of the stuffing box and its relation with respect to the walls of the radiator and partition therein.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the accompanying drawings forming part of this specification:

Figure 4:
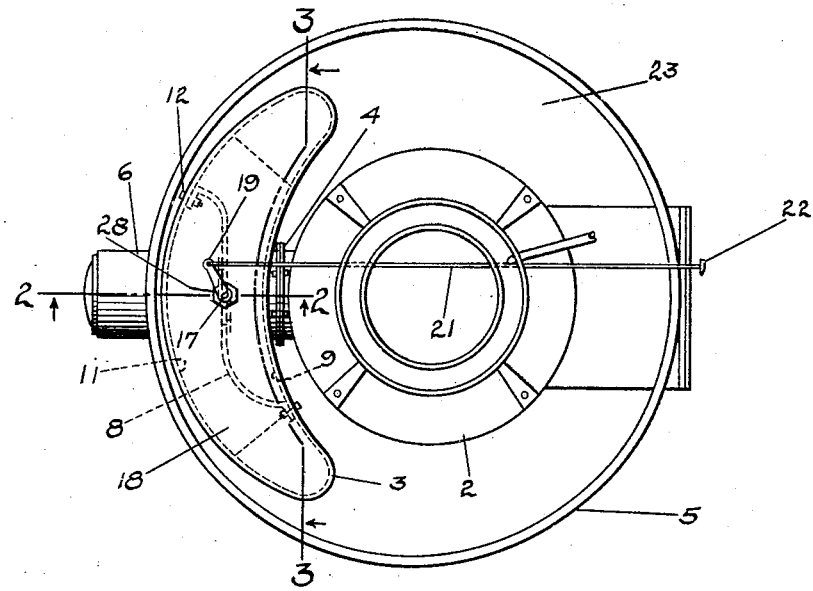
Figure 4 is a plan view of Figure 2.
Figure 2:
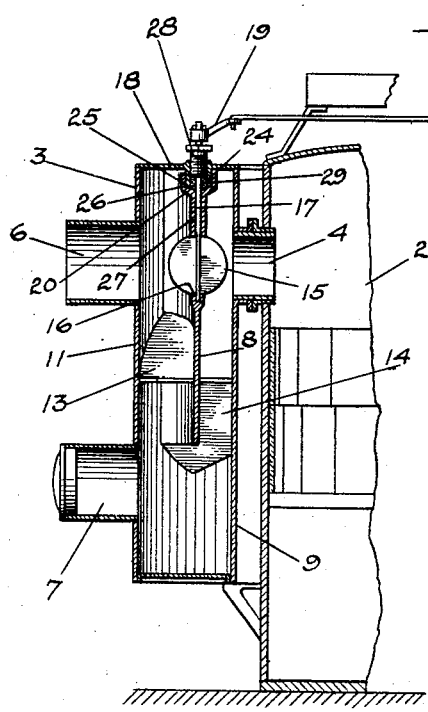
Figure 2 is a detail sectional view, showing the invention applied to a crescent radiator.

In the selected embodiment of the invention here shown, for purposes of disclosure, there is illustrated in Figures 2 and 4, a portion of a furnace of the hot air type, comprising the furnace body 2 and crescent radiator 3, connected to the furnace body 2 by a suitable connection 4. The body 2 and radiator 3 are enclosed within a suitable casing 5, shown in Figure 4.

The crescent radiator here shown, is similar to the one shown in the above mentioned patent, and includes the smoke flue 6 and a clean out flue 7, best shown in Figure 2. A vertical partition 8 is mounted in the upper portion of the radiator and is secured to the inner and outer walls 9 and 11, respectively, by suitable bolts 12, shown in Figure 4. Baffle plates 13 and 14 are provided within the radiator for directing the circulation of the air therethrough. A damper 15 is mounted in an opening 16 provided in the partition 8, and has a rod 17 projecting through the upper wall 18 of the radiator. An arm 19 is terminally mounted upon the rod 17 and has a rod 21 connected therewith, one end of which is positioned at the front of the furnace and has a hand grip 22, whereby the damper may be conveniently opened and closed.

Figure 1:
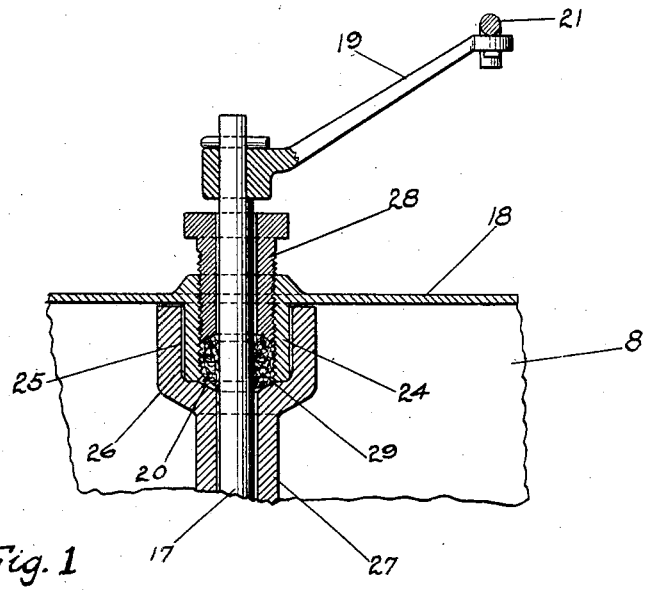
Figure 1 is a detail sectional view, showing the general construction of our improved stuffing box.
Figure 3:
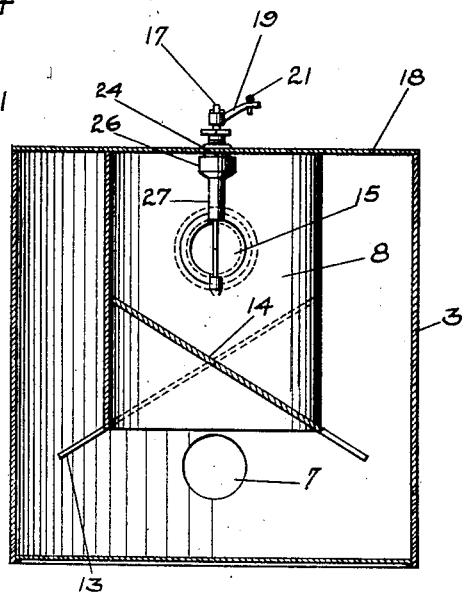
Figure 3 is a detail sectional view on the line 3—3 of Figure 4, showing only the radiator.

A feature of this invention resides in the means provided for preventing leakage of gaseous fumes from the interior of the radiator into the space 23 defined by the outer casing 5 and the wall of the body 2. To prevent leakage of gaseous fumes into this space, the upper wall 18 of the radiator 3 has a sleeve 24 secured thereto by such means as, for example, welding. This sleeve projects into the interior of the radiator and is received in a socket 25, provided in a hub 26 formed in the partition 8, as shown in Figure 3. The hub 26 has a cylindrical extension 27 integrally formed therewith and bored to receive the damper control rod 17. A packing nut 28 is received in threaded engagement with the sleeve 24, and has a lower conical edge between which and the conical bottom 20 of the socket 25, a suitable packing 29 may be compressed by rotation of the packing nut 28. The rod 17 traverses the packing nut 28, as shown in Figure 1. Rotation of the packing nut 28 will tightly compress the packing 29 against the damper rod 17 so as to positively prevent the escape of gaseous fumes from the interior of the radiator at this point.

By welding the sleeve 24 to the upper wall 18 of the radiator, the sleeve in effect becomes an integral part of the wall, thus preventing the escape of gas at the point where the sleeve 24 is connected with the wall 18. In structures of this type, the damper control rod 17 has heretofore passed through an aperture provided in the upper wall 18 of the radiator, thus permitting the gaseous fumes to escape from the interior of the radiator into the chamber 23 within the casing 5. We have found that by the provision of the sleeve 24, socket 25 and the packing nut 28, the joint between the damper rod 17 and the casing wall 18, may be positively sealed against leakage, so that it will be impossible for gaseous fumes to enter the chamber 23, from whence such fumes might be conveyed to the rooms of a building by the usual heat-conducting flues or pipes, not shown.

The construction and arrangement of the parts is also such that it may readily be assembled without loss of time, thus providing such an apparatus which may be manufactured at a small cost and at the same time, providing an apparatus which will be positively gas tight when installed in a furnace.

Figure 5:
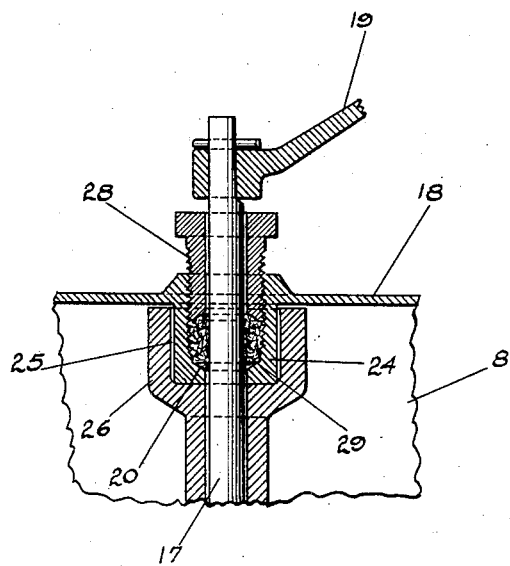
Figure 5 is a detail sectional view, showing a modified construction.

Figure 5 illustrates a modification wherein the conical bottom 20 is a part of the sleeve 24, and not a part of the hub 26, as shown in Figure 1. With the exception of this change, the two forms are substantially the same.

We claim as our invention:

1. The combination with a casing, the walls of which define a closed chamber having smoke inlet and outlet flues connected therewith and also having a partition therein dividing a portion of the chamber into two sections, of a damper mounted in said partition for controlling circulation through said chamber, a control rod connected with the damper and extending through a wall of the casing, said partition having a socket therein adapted to receive a sleeve provided on a wall of the casing, said socket and sleeve being traversed by said control rod, a suitable packing within the sleeve encircling the control rod, and means engageable with said sleeve for compressing said packing against the rod to prevent leakage.

2. The combination with a casing, the walls of which define a closed chamber having smoke inlet and outlet flues connected therewith and also having a partition depending from the upper wall of the casing and dividing a portion of said chamber into two sections, of a damper mounted in said partition for controlling circulation through said chamber, a control rod connected with the damper and extending through the upper wall of the casing, said partition having a socket therein adjacent to said upper wall adapted to receive an interiorly threaded sleeve provided on said wall, said socket and sleeve being traversed by said control rod, a suitable packing within the sleeve encircling the control rod, and a packing nut received in threaded engagement with said sleeve and adapted to compress said packing against the rod to prevent leakage.

In witness whereof, we have hereunto set our hands this 20th day of August 1928.

JOHN HENRY CROSS.
ERNEST W. FRANKLIN
EARL L. SCHNEIDER.